United States Patent [19]

Sellmaier

[11] 4,253,339
[45] Mar. 3, 1981

[54] GAUGE

[76] Inventor: Engelbert Sellmaier, Hochwaldstrasse 2a, D-8240 Schoenau am Koenigssee, Fed. Rep. of Germany

[21] Appl. No.: 75,277

[22] Filed: Sep. 13, 1979

[30] Foreign Application Priority Data

Sep. 13, 1978 [DE] Fed. Rep. of Germany ... 7827218[U]

[51] Int. Cl.³ .............................................. G01L 7/04
[52] U.S. Cl. ................................. 73/732; 73/437 A
[58] Field of Search ................. 73/732, 733, 734, 735, 73/736, 737, 738, 739, 740, 741, 742, 743, 432 A, 363.7; 58/115, 140 R

[56] References Cited

U.S. PATENT DOCUMENTS

| 224,227 | 2/1880 | Rivett | 58/115 |
| 898,148 | 9/1908 | Spencer | 73/732 |
| 1,594,726 | 8/1926 | Harrison | 73/732 |
| 2,964,947 | 12/1960 | De Jong | 73/363.7 |

Primary Examiner—Donald O. Woodiel
Attorney, Agent, or Firm—Craig and Antonelli

[57] ABSTRACT

A guage such as is used in connection with a Bourdon tube comprises two bearing plates, at least two metallic spacer columns interconnecting the bearing plates, a pointer shaft rotatably mounted between the bearing plates, and a spiral spring fixed at its inner end to the shaft. One spacer column has an axial slot extending from one end of the column for receiving the outer end of the spiral spring. The outer spring end is inserted into the slot when the pointer shaft carrying the spring is assembled thereby saving the extra step in the manufacturing process required for locating the outer spring end in conventional gauges of this type. The slotted end of the spacer column extends beyond the outer side of the respective bearing plate so that the slot may be engaged by a screw driver for pre-tensioning the spring after complete assembly of the gauge.

8 Claims, 3 Drawing Figures

GAUGE

BACKGROUND OF THE INVENTION

It is common in gauges made of metal, as they are for instance used in connection with a Bourdon tube for measuring and indicating pressure or temperature, to fix the spiral spring used for resetting the pointer shaft by providing a transverse bore in a spacer shaft of the gauge or in an additional shaft specifically provided for this purpose, threading the outer end of the spiral spring into this bore, and wedging it therein by means of a usually conical pin.

In another known variation, a spacer column of the gauge is provided with a radial groove instead of the transverse bore, and the outer end of the spiral spring is caulked in the groove.

Further variations are known in which the end of the spiral spring is welded or glued to a spacer column.

It is a common drawback of all known gauges that they require a separate step in the manufacturing process for fixing the outer end of the spiral spring. Particularly in high-response gauges employing very fine spiral springs, this process step is cumbersome and causes a relatively high reject rate. In addition, in the known gauges, the outer end of the spiral spring can be fixed only after the gauge has been assembled, which excludes economic automation.

It is an object of the invention to devise a gauge of the above-mentioned type in such a manner that the previously required additional step of the manufacturing process for positioning the outer end of the spiral spring is saved.

It is another object of the invention to provide a gauge in which the spiral spring is mounted in a completely tension-free manner at least until the assembly of the gauge has been completed.

It is a further object of the invention to provide a gauge in which a secure fixing of the spring end is achieved during the normal process of assembling the gauge without additional structural provisions or additional manufacturing steps.

It is another object of the invention to provide a gauge which allows the tension and position of the spiral spring to be adjusted upon completion of the assembling process.

SUMMARY OF THE INVENTION

The gauge of the present invention comprises a pair of bearing plates; at least two metallic spacers which at their ends are connected to either bearing plate, one of the spacers having a slot extending from one end of said one spacer towards the other end thereof; a pointer shaft rotatably mounted between the bearing plates; and a spiral spring having an inner end fixed to the pointer shaft and and outer end passing through the slot of said one spacer.

The outer end of the spiral spring is inserted into the slot of the said spacer during assembly of the gauge components so that, in the completely assembled condition of the gauge, the spring end is positioned without requiring a separate step in the manufacturing process. At least until the assembly is completed, the spiral spring may be free of any tension, which was practically impossible with prior art gauges in which the spring end is caulked or riveted. The slot to be provided in one of the spacers does not complicate the manufacture as compared to the prior art gauges which, instead, required a transverse bore or a radial groove.

DETAILED DESCRIPTION OF A PREFERRED EMBODIMENT

Figures 1, 2:
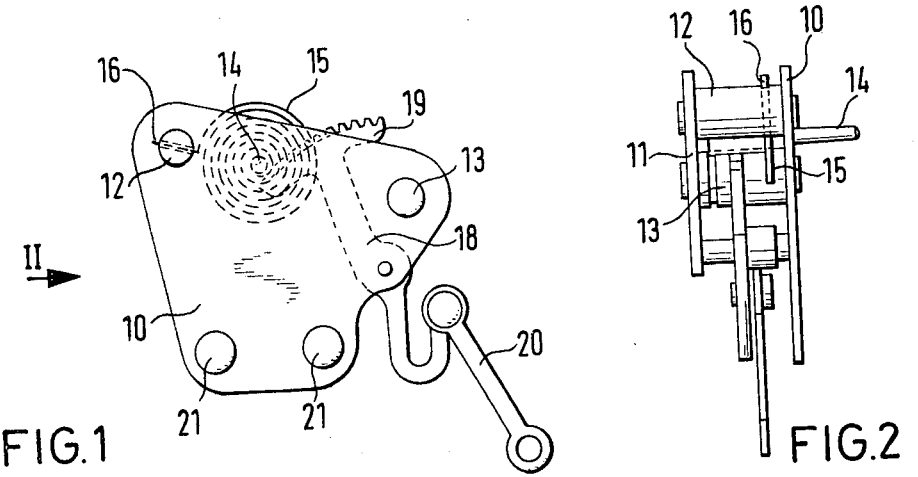
FIG. 1 shows a side view of a gauge according to a preferred embodiment of the invention.
FIG. 2 is an end view of the gauge, viewed in the direction of the arrow II in FIG. 1.

According to the drawing, the gauge has two bearing plates 10 and 11 interconnected by two metallic spacer columns 12 and 13. A pointer shaft 14 is pivotally mounted in the bearing plates, and a spiral spring 15 is disposed around the pointer shaft between the two bearing plates 10 and 11. The inner end of the spiral spring 15 is fastened to the pointer shaft 14, while the outer end 16 of the spiral spring 15 extends through an axial slot 17 in the spacer column 12.

A lever 18 is also mounted between the bearing plates 10 and 11 and carries a toothed segment 19 which meshes with a pinion provided on the pointer shaft, and a further lever 20 transmits the excursion of a measuring element (not shown) to the pointer shaft 14. Bores 21 are provided in the bearing plate 10 for mounting the gauge on some other structure.

Figure 3:
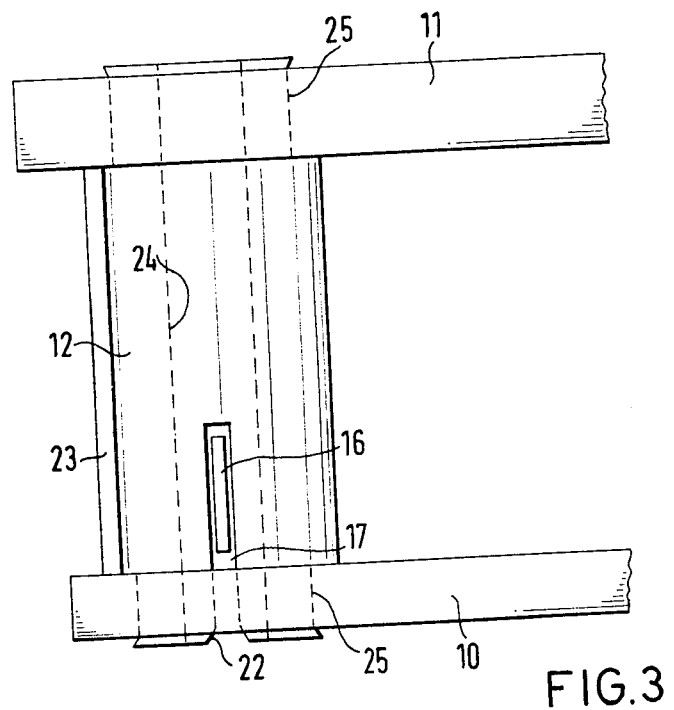
FIG. 3 shows the slotted spacer column of the gauge in FIGS. 1 and 2, with the end of the spiral spring inserted in the slot, this view being on an enlarged scale.

As shown in FIG. 3, the slot 17 is provided at its outer end with an enlarged portion 22 for simplifying the inserting of the spiral spring end 16. As furthermore shown in FIG. 3 with particular clarity, the bearing plate 10 confines the slot 17 such that the spring end 16 is prevented from leaving the slot 17 in the axial direction.

As further indicated in FIG. 3, the spacer column 12 is provided with a flattening 23 which ensures proper positioning of the spacer column 12 and thus the alignment of the slot 17 with respect to the pointer shaft 14 during assembly. Instead of the flattening 23, the spacer column 12 may be provided with any other desired profile differing from a circular shape.

As shown in FIG. 3 with respect to the spacer column 12 only, both spacer columns 12 and 13 have a longitudinal bore 24 and are held by being riveted in bores 25 of the bearing plates 10 and 11. By virtue of the slotted end of the spacer column 12 extending beyond the bearing plate 10, the slot 17 may be engaged by a screw driver upon the final assembly of the gauge in order to rotate the spacer column 12 about its axis for adjusting the spiral spring 15 if required. It is also possible to dimension the bore 25 in the bearing plate 10 and the stud of the spacer column 12 engaging the bore in such a manner that a press-fit is obtained which causes narrowing of the slot 17 during assembly, thereby taking influence on the guidance of the spiral spring end 16. Also, the spring end 16 may be substantially completely fixed to the slot 17 by this means.

I claim:
1. A gauge comprising
   (a) a pair of bearing plates,
   (b) at least two metallic spacers which at their ends are connected to either bearing plate, one of the spacers having a slot extending from one end of said one spacer towards the other end thereof,

(c) a pointer shaft rotatably mounted between the bearing plates, and (d) a spiral spring having an inner end fixed to the pointer shaft and an outer end passing through the slot in said one spacer.

2. A gauge comprising:
(a) a pair of bearing plates,
(b) at least two metallic spacers which at their ends are connected to either bearing plate, one of the spacers having a slot extending from one end of said one spacer towards the other end thereof,
(c) a pointer shaft rotatably mounted between the bearing plates, and
(d) a spiral spring having an inner end fixed to the pointer shaft and an outer end passing through the slot in said one spacer, wherein the slot has an enlarged section at said one end of said one spacer.

3. A gauge comprising:
(a) a pair of bearing plates,
(b) at least two metallic spacers which at their ends are connected to either bearing plate, one of the spacers having a slot extending from one end of said one spacer towards the other end thereof,
(c) a pointer shaft rotatably mounted between the bearing plates, and
(d) a spiral spring having an inner end fixed to the pointer shaft and an outer end passing through the slot in said one spacer, wherein said one spacer has a non-circular cross-section.

4. A gauge comprising:
(a) a pair of bearing plates,
(b) at least two metallic spacers which at their ends are connected to either bearing plate, one of the spacers having a slot extending from one end of said one spacer towards the other end thereof,
(c) a pointer shaft rotatably mounted between the bearing plates, and
(d) a spiral spring having an inner end fixed to the pointer shaft and an outer end passing through the slot in said one spacer, wherein the slot is outwardly confined by one of the bearing plates in the assembled condition of the gauge.

5. The gauge of claim 4, wherein said one end of said one spacer is inserted in a bore provided in said one bearing plate, the bore being so dimensioned that the slot is narrowed in the assembled condition of the gauge.

6. The gauge of claim 5, wherein said one spacer end is press-fitted in the bore.

7. The gauge of claim 5, wherein said one spacer end is riveted in the bore.

8. The gauge of claim 4, wherein said one spacer end extends through and beyond said one bearing plate.

* * * * *